J. W. SUTTON.
PNEUMATIC CUSHION SPRING FOR WHEELED VEHICLES.
APPLICATION FILED AUG. 26, 1911.

1,048,371.  Patented Dec. 24, 1912.

UNITED STATES PATENT OFFICE.

JOSEPH WILLIAM SUTTON, OF BRISBANE, QUEENSLAND, AUSTRALIA, ASSIGNOR TO MARY SUTTON, OF BRISBANE, AUSTRALIA.

PNEUMATIC CUSHION-SPRING FOR WHEELED VEHICLES.

1,048,371.    Specification of Letters Patent.    Patented Dec. 24, 1912.

Application filed August 26, 1911. Serial No. 646,208.

*To all whom it may concern:*

Be it known that I, JOSEPH WILLIAM SUTTON, a subject of the King of the United Kingdom of Great Britain and Ireland and of the British dominions beyond the seas, residing at Brisbane, in the State of Queensland, Commonwealth of Australia, have invented new and useful Improvements in Pneumatic Cushion-Springs for Wheeled Vehicles, of which the following is a specification.

This invention relates to improvements in pneumatic cushion springs for wheeled vehicles and the principal object of the invention is to dispense with the use of leaf springs and with pneumatic tires, although it is within the scope of the invention to use the same in connection with such springs and tires or with either of them.

Figure 1:
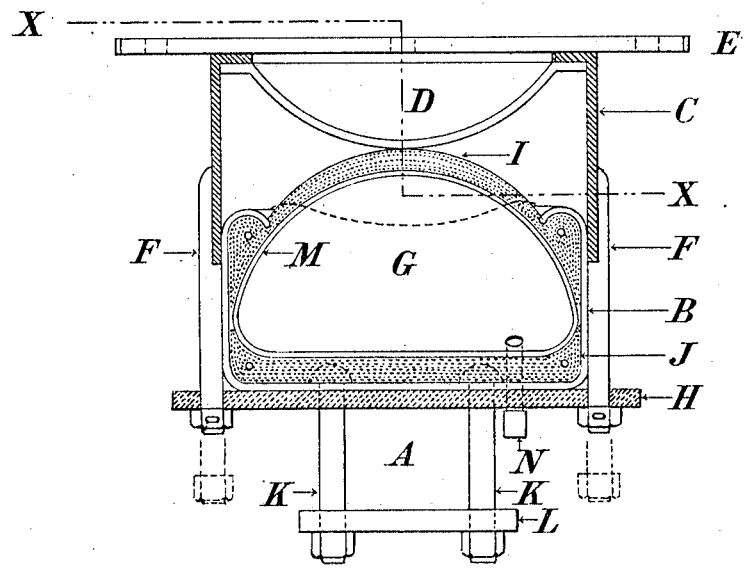
Figure 2:
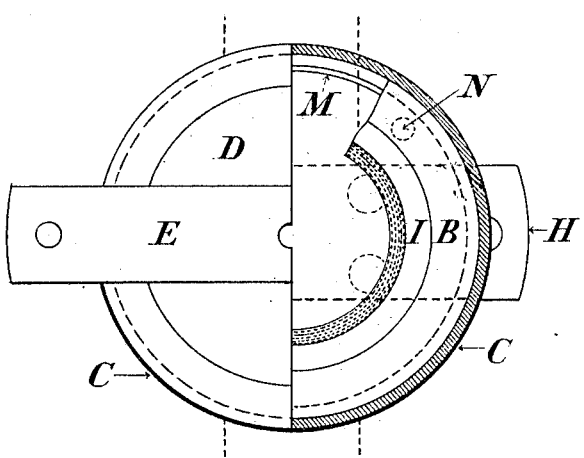

Referring to the drawing, Figure 1 is a transverse section of one form of the invention, and Fig. 2 is a view partly in plan and partly in section on the line X—X of Fig. 1.

The axle is shown at A and above it is shown a metal cup B with inturned edges at the top, within which is a foundation packing J of papier mâché or other suitable material.

M is a ball, bag or lining of rubber or suitable distensible material, which on compression assumes the form shown in dotted lines in the drawings, and G is the space within the ball or bag. The foundation packing J fits the normal conformation of the bag when distended.

A flexible protecting cover of vulcanized rubber or other suitable material is shown at I, the same having a circumferential retaining cover, which fits under the inturned edges on the top of the cup B. This protecting cover prevents the entrance of all moisture which would tend to deteriorate the delicate distensible hollow bag M.

C is a metal cylinder with a flanged top, having guide bolts F sliding in a supporting plate H on the axle and D is a dished cover fitted in the cylinder C or formed integrally therewith, which rests upon the top of the bag M, being separated therefrom by the protecting cover. The cylinder C is fast to the plate E which is bolted to the vehicle body or spring as the case may be and this cylinder slides vertically over the outside of the cup B over which it fits snugly.

At K are shown bolts coöperating with the plate L to fasten the device to the axle.

In using the invention, the load compresses the cushion cover I and the pneumatic cushion is thus thrust into a position which more or less approaches what is indicated by the dotted lines.

What I claim is—

1. A removable pneumatic cushioning member for vehicles comprising in combination an inner hollow distensible bag, a foundation packing shaped to fit the normal conformation of said bag beneath the same, a flexible protecting cover for the top of said bag having a circumferential shoulder, and an outer metal cup inclosing said bag, foundation and cover and having an inturned upper edge fitting over the shoulder on said cover, substantially as described.

2. A cushioning means for vehicles comprising a support H, a metal cylinder, C and a suitable guide for said cylinder: in combination with a metal cup within said cylinder having an inturned upper edge, an inner distensible hollow bag, a foundation packing within said cup fitting the under side of said bag, and a flexible protecting cover fitting over said bag and having a shoulder fitting under the inturned edge of said cup, substantially as described.

In testimony whereof I have signed my name to this specification in the presence of two subscribing witnesses.

JOSEPH WILLIAM SUTTON.

Witnesses:
E. GARLAN ABELL,
OLIVE R. ABELL.